United States Patent
Blechen (10) Patent No.: US 9,058,040 B2
(45) Date of Patent: Jun. 16, 2015

(54) AUTOMATIC PILOT PITCH ANGLE COMPENSATION

(75) Inventor: Frederick Charles Henry Blechen, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 1619 days.

(21) Appl. No.: 12/394,299

(22) Filed: Feb. 27, 2009

(65) Prior Publication Data

US 2010/0222944 A1 Sep. 2, 2010

(51) Int. Cl.
*G05D 1/08* (2006.01)
*G05D 1/06* (2006.01)
*G05D 1/04* (2006.01)

(52) U.S. Cl.
CPC .............. *G05D 1/0623* (2013.01); *G05D 1/044* (2013.01); *G05D 1/085* (2013.01)

(58) Field of Classification Search
CPC ..... G05D 1/044; G05D 1/0623; G05D 1/085; B64C 13/00; B64C 13/16; G09B 9/10
USPC .............................................. 701/6; 244/181
See application file for complete search history.

(56) References Cited

U.S. PATENT DOCUMENTS

| | | | |
|---|---|---|---|
| 2,553,546 A * | 5/1951 | Brannin | 244/179 |
| 2,561,291 A | 7/1951 | Rethorst | |
| 3,128,967 A | 4/1964 | Hays, Jr. | |
| 3,691,356 A | 9/1972 | Miller | |
| 3,967,799 A | 7/1976 | Muller | |
| 3,989,208 A | 11/1976 | Lambregts | |
| 4,490,793 A | 12/1984 | Miller | |
| 4,589,616 A | 5/1986 | Zweifel et al. | |
| 4,641,268 A | 2/1987 | Zweifel et al. | |
| 4,767,085 A | 8/1988 | Boudreau et al. | |
| 4,841,448 A | 6/1989 | Ford | |
| 5,029,778 A | 7/1991 | DeLuca | |
| 5,442,909 A | 8/1995 | Snow et al. | |
| 5,606,505 A | 2/1997 | Smith et al. | |
| 5,984,240 A * | 11/1999 | Shinagawa | 244/195 |
| 6,062,513 A | 5/2000 | Lambregts | |
| 6,246,929 B1 | 6/2001 | Kaloust | |

(Continued)

FOREIGN PATENT DOCUMENTS

| | | |
|---|---|---|
| DE | 102007012425 A1 | 9/2008 |
| EP | 0482250 A1 | 4/1992 |
| EP | 1364872 A2 | 11/2003 |
| FR | 2909462 A1 | 6/2008 |

OTHER PUBLICATIONS

U.S. Appl. No. 12/274,756, filed Nov. 20, 2008, Blechen.

(Continued)

*Primary Examiner* — John Q Nguyen
*Assistant Examiner* — Kyung Kim
(74) *Attorney, Agent, or Firm* — Yee & Associates, P.C.

(57) ABSTRACT

A method, apparatus, and computer program product are present for operating an aircraft. Responsive to a command to hold an altitude of the aircraft, an adjustment to a pitch angle of the aircraft needed to substantially maintain the altitude of the aircraft is identified using a lift for the aircraft to form an identified adjustment to the pitch angle to reduce altitude deviations from at least one of a change in configuration of a number of flight surfaces and changes in wind. The pitch angle of the aircraft is adjusted using the identified adjustment during flight.

23 Claims, 6 Drawing Sheets

(56) References Cited

U.S. PATENT DOCUMENTS

| | | | |
|---|---|---|---|
| 6,282,466 | B1 | 8/2001 | Nolte et al. |
| 6,922,618 | B2 | 7/2005 | Luo |
| 7,284,984 | B1 | 10/2007 | Zyskowski |
| 7,706,932 | B2 | 4/2010 | Morales De La Rica et al. |
| 2008/0133069 | A1 | 6/2008 | Morales De La Rica et al. |
| 2010/0042270 | A1 | 2/2010 | Villaume |
| 2010/0042271 | A1 | 2/2010 | Holzhausen |
| 2010/0087970 | A1 | 4/2010 | Blechen |
| 2010/0125378 | A1 | 5/2010 | Blechen |
| 2010/0222944 | A1 | 9/2010 | Blechen |

OTHER PUBLICATIONS

Final Office Action, dated Nov. 16, 2012, regarding U.S. Appl. No. 12/247,756, 13 pages.

USPTO non-final office action dated May 8, 2012 regarding U.S. Appl. No. 12/274,756, 48 Pages.

Office Action, dated Sep. 9, 2013, regarding U.S. Appl. No. 12/274,756, 14 pages.

Extended European Search Report, dated Jul. 7, 2014, regarding Application No. EP10155029.1, 6 pages.

* cited by examiner

AUTOMATIC PILOT PITCH ANGLE COMPENSATION

GOVERNMENT LICENSE RIGHTS

This invention was made with Government support under contract number N00019-04-C-3146 awarded by the United States Navy. The Government has certain rights in this invention.

BACKGROUND INFORMATION

1. Field

The present disclosure relates generally to aircraft and, in particular, to a method and apparatus for operating an aircraft. Still more particularly, the present disclosure relates to a method and apparatus for compensating for pitch angles during maneuvering of an aircraft.

2. Background

During operation, an aircraft may fly in the air as a result of an aerodynamic force called lift. Lift is generated by the wings of an aircraft as air flows past the wings as a result of forward movement of the aircraft. The wings of an aircraft generate lift because of a pressure reduction on the upper side of the wings. The lower pressure on the upper side of a wing combined with a higher pressure on the underside of the wing provides the lift. Lift may be increased by increasing the angle of the wing cord relative to the airflow. This angle is also referred to as the angle of attack.

When an aircraft performs a turn, the roll angle increases and the lift vector follows the roll for the turn, decreasing the lift in the vertical direction. With decreased lift in the vertical direction, the aircraft also may change altitude. These changes in the movement of the aircraft are often undesirable during a turn. Instead, it is desirable to substantially maintain the altitude of the aircraft during the turn.

Currently available control systems for aircraft use a versine function and a polynomial function of air pressure or dynamic pressure to compensate for a pitch angle or angle of attack that may cause the aircraft to stay at the same altitude during a turn. These functions may be inaccurate for roll angles above 30 degrees.

Therefore, it would be advantageous to have a method and apparatus that takes into account one or more of the issues described above, as well as possibly other issues.

SUMMARY

In one advantageous embodiment, a method is present for operating an aircraft. An adjustment to a pitch angle of the aircraft needed to substantially maintain the altitude of the aircraft during a turning of the aircraft using a current lift for the aircraft to form an identified adjustment to the pitch angle is identified in response to the turning of the aircraft. The turning of the aircraft is performed using the identified adjustment to the pitch angle of the aircraft.

In another advantageous embodiment, a method is present for operating an aircraft. Responsive to a command to hold an altitude of the aircraft, an adjustment to a pitch angle of the aircraft needed to substantially maintain the altitude of the aircraft is identified using a lift for the aircraft to form an identified adjustment to the pitch angle to reduce altitude deviations from at least one of a change in configuration of a number of flight surfaces and changes in wind. The pitch angle of the aircraft is adjusted using the identified adjustment during flight.

In still another advantageous embodiment, an apparatus comprises a process and a computer. The process is capable of identifying an adjustment to a pitch angle of an aircraft needed to substantially maintain an altitude of the aircraft using a lift for the aircraft, in response to a command to hold the altitude of the aircraft, to form an identified adjustment to the pitch angle to reduce altitude deviations from at least one of a change in configuration of a number of flight surfaces and changes in wind. The pitch angle of the aircraft is adjusted using the identified adjustment during flight. The process is stored on the computer and is capable of being executed by the computer.

In another advantageous embodiment, an apparatus comprises a process and a computer. The process is capable of identifying an adjustment to a pitch angle during a turning of an aircraft needed to substantially maintain an altitude of the aircraft using a change in a current lift for the aircraft to form an identified adjustment. The identified adjustment is identified during the turning of the aircraft. The process is stored on the computer and is capable of being executed by the computer.

In yet another advantageous embodiment, a computer program product for operating an aircraft comprises a computer recordable storage medium and program code stored on the computer recordable storage medium. Program code is present for identifying an adjustment to a pitch angle of the aircraft needed to substantially maintain the altitude of the aircraft during the turning of the aircraft using a current lift for the aircraft to form an identified adjustment to the pitch angle in response to a turning of the aircraft when holding an altitude. Program code is also present for performing the turning of the aircraft using the identified adjustment to the pitch angle of the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
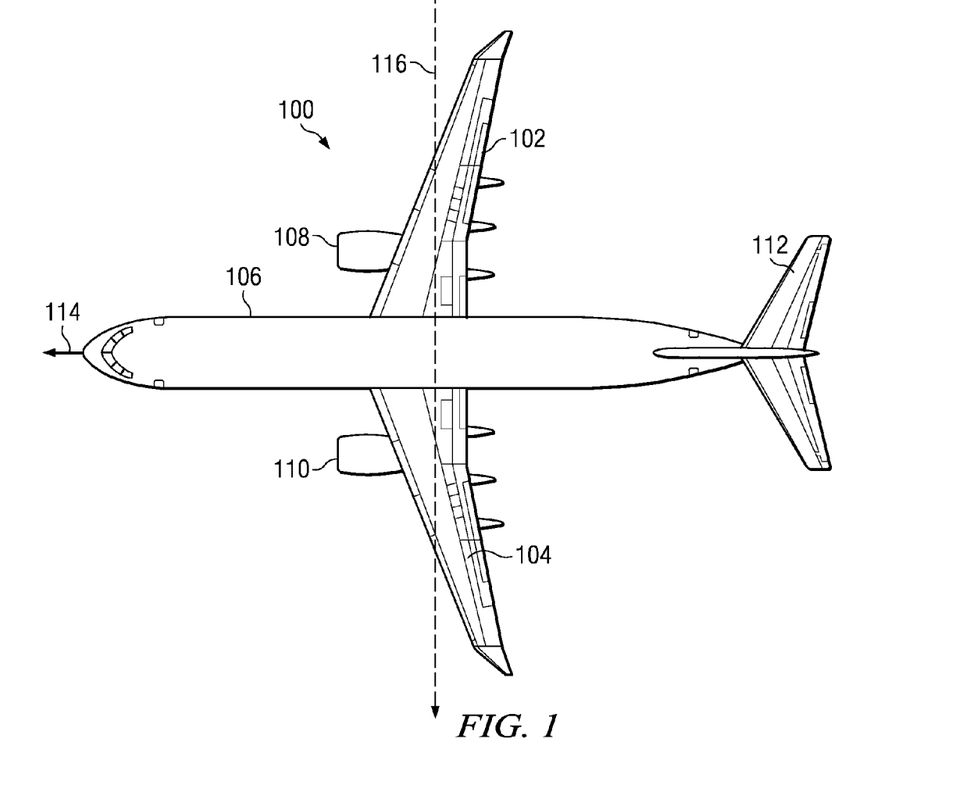
FIG. 1 is a diagram of an aircraft in which an advantageous embodiment may be implemented.

With reference now to the figures and, in particular, with reference to FIG. 1, a diagram of an aircraft is depicted in which an advantageous embodiment may be implemented. Aircraft 100 is an example of an aircraft in which dynamic pitch angle altitude compensation for roll angle for maneuvering flight may be implemented. In particular, hardware and/or software may be implemented within aircraft 100 to compute the pitch angle compensation to substantially maintain altitude, while using the roll angle to maneuver.

In this illustrative example, aircraft 100 has wings 102 and 104 attached to fuselage 106. Aircraft 100 also includes engine 108, engine 110, and tail 112. Aircraft 100 may make a number of different types of maneuvers. These maneuvers include, for example, a wide range of roll angles, which are larger than around 30 degrees as seen in most larger aircraft. In this case, for all lateral maneuvers, aircraft 100 remains at the same altitude.

In performing these maneuvers, aircraft 100 may change a roll angle. A roll angle represents the turning of an aircraft about longitudinal body axis 114. The amount of rotation around longitudinal body axis 114 is the roll angle. The roll angle also may be referred to as a bank angle or roll attitude. In turning, aircraft 100 may change its pitch angle. The pitch angle represents the turning of an aircraft about an axis, such as axis 116. In these depicted examples, axis 116 extends through the wing of aircraft 100. The pitch angle may be adjusted to maintain an altitude of aircraft 100 during a turning of aircraft 100.

The different advantageous embodiments may be implemented in many other types of aircraft such as, for example, a commercial aircraft, a military aircraft, an unmanned aerial vehicle (UAV), and/or some other suitable type of aircraft.

Figure 2:
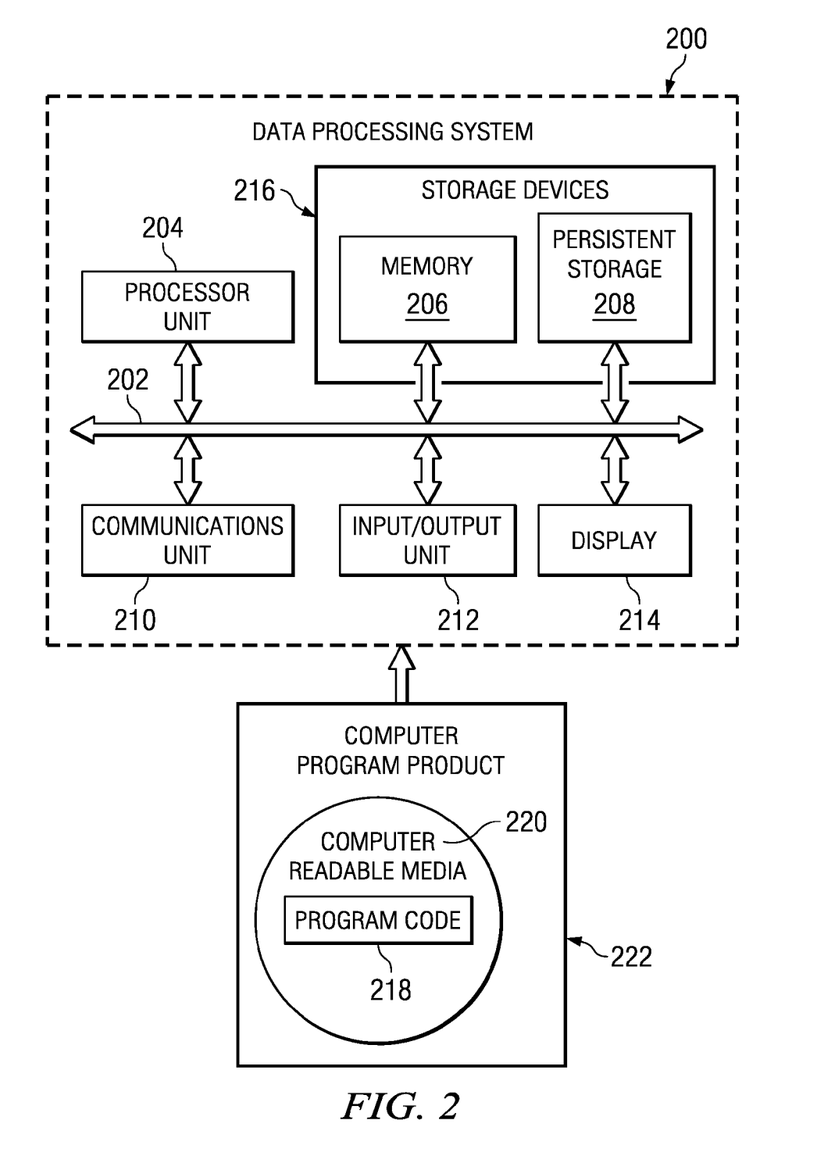
FIG. 2 is a diagram of a data processing system in accordance with an advantageous embodiment.

Turning now to FIG. 2, a diagram of a data processing system is depicted in accordance with an advantageous embodiment. Data processing system 200 is an example of a data processing system that may be found in an aircraft such as, for example, aircraft 100 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information such as, for example, without limitation, data, program code in functional form, and/or other suitable information either on a temporary basis and/or a permanent basis. Memory 206, in these examples, may be, for example, a random access memory or any other suitable volatile or non-volatile storage device.

Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form such as, for example, an optical or magnetic disk that is inserted or placed into a drive or other device that is part of persistent storage 208 for transfer onto a storage device, such as a hard drive that is part of persistent storage 208.

In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account a number of different issues and/or factors. For example, the different advantageous embodiments recognize and take into account that the existing control systems for allowing an aircraft to hold altitude during turns is inaccurate for angles above 30 degrees because the current systems employ an approximation for the reciprocal of the inverse of the cosine of the roll angle.

The different advantageous embodiments also recognize and take into account that currently used control systems do not take into account the weight of the aircraft, wing area, and/or lift loss occurring from one or more control surfaces used to maneuver the aircraft in and out of a turn. Further, currently used systems may be optimized for only one roll rate, while the autopilot and flight management system may use different roll rates.

Thus, the different advantageous embodiments provide a method and apparatus for operating an aircraft. During turning of the aircraft, an adjustment to a pitch angle needed to substantially maintain an altitude of the aircraft using a change in a current lift for the aircraft is identified. Turning of the aircraft is performed using the identified adjustment to the pitch angle.

The different advantageous embodiments also may use information about flight control surfaces to substantially maintain the altitude of the aircraft. This information may be used to reduce deviations in altitude that may be caused by changes in configuration of these flight control surfaces during various maneuvers. For example, without limitation, the information for a flight control surface may include data for a flap or other suitable type of control surface.

In these examples, the adjustment to the pitch angle may be identified dynamically. Dynamically identifying an adjustment for the roll angle during a turn means that the adjustment is identified as the turn occurs, rather than before the turn begins. Further, dynamically identifying the adjustment means that the adjustment may be performed in response to a number of events occurring during the turn.

These events may be periodic and/or non-periodic events. For example, the adjustment may be identified periodically every few seconds, every few milliseconds, or some other suitable period of time. In still other advantageous embodiments, the event may be a non-periodic event in which a status, some parameter for the aircraft, and/or condition around the aircraft changes during the turn. The adjustment may be determined each time such an event occurs or after a number of occurrences of the event.

In yet other advantageous embodiments, the dynamic identification of the adjustment to the pitch angle may be made continuously. An adjustment may be identified continuously if the adjustment is identified as many times as possible based on the data processing system or device used to identify the adjustment to the pitch angle. A number, when referring to an item used herein, refers to one or more items. For example, a number of events refers to one or more events.

Figure 3:
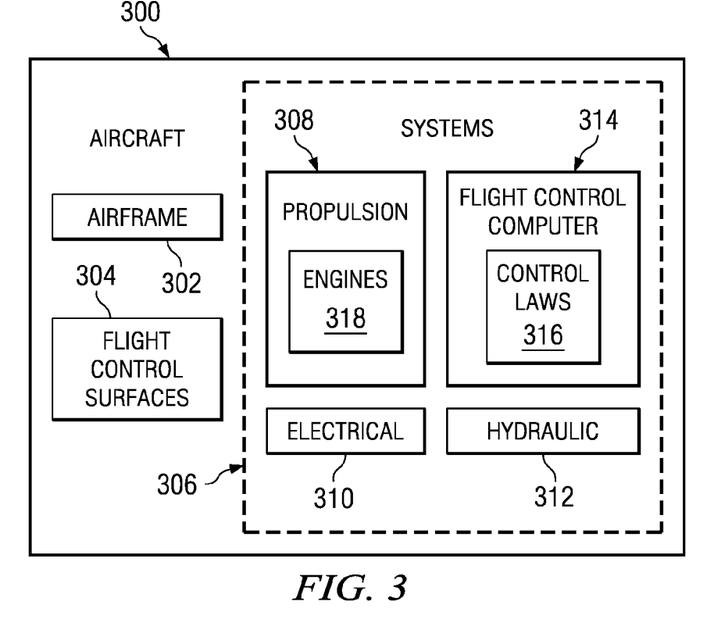
FIG. 3 is a block diagram of an aircraft in accordance with an advantageous embodiment.

Turning next to FIG. 3, a block diagram of an aircraft is depicted in accordance with an advantageous embodiment. Aircraft 300 illustrates the components that may be found in an aircraft such as, for example, aircraft 100 in FIG. 1. In this depicted example, aircraft 300 has airframe 302 on which flight control surfaces 304 may be located. Further, systems 306 also may be integrated into or on airframe 302. These systems include, for example, propulsion system 308, electrical system 310, hydraulic system 312, and flight control computer 314.

Flight control computer 314 may control various components such as, for example, propulsion system 308, electrical system 310, and hydraulic system 312 to control the operation of aircraft 300. Flight control computer 314 may perform these controls through the execution of software containing control laws 316. With control laws 316, flight control computer 314 is capable of controlling flight control surfaces 304 through commands sent to electrical system 310 and/or hydraulic system 312.

One or more of the different advantageous embodiments may be implemented within software such as, for example, control laws 316, to allow for turning of aircraft 300 in a manner that reduces and/or avoids substantial changes in altitude of aircraft 300 during the turn.

Figure 4:
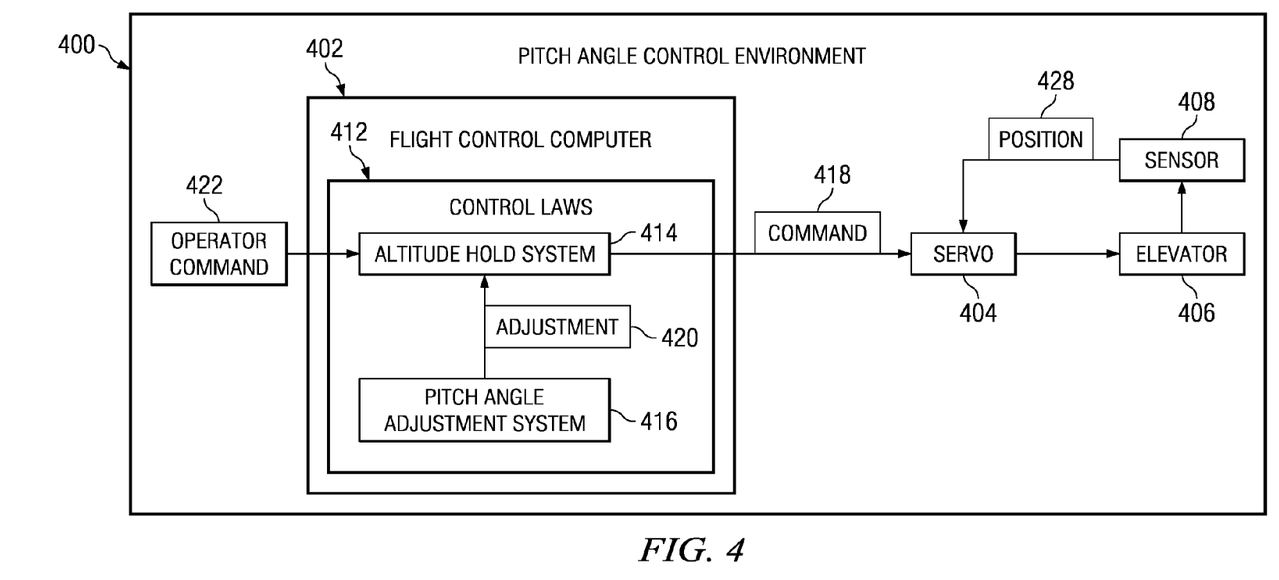
FIG. 4 is a diagram of a pitch angle control environment in accordance with an advantageous embodiment.

Turning now to FIG. 4, a diagram of a pitch angle control environment is depicted in accordance with an advantageous embodiment. Pitch angle control environment 400 is an example of an environment that may be implemented in aircraft 300 in FIG. 3. Pitch angle control environment 400 includes flight control computer 402, servo 404, elevator 406, and sensor 408.

Flight control computer 402 executes software such as, for example, control laws 412. Control laws 412 control the operation of an aircraft in response to commands generated by an operator, state information about the aircraft, position of the aircraft, orientation of the aircraft, and other suitable information.

In this illustrative example, control laws 412 may include altitude hold system 414 and pitch angle adjustment system 416. Altitude hold system 414 controls the pitch of an aircraft. In other words, altitude hold system 414 controls the altitude of the aircraft. Altitude hold system 414, in these examples, maintains an aircraft at substantially the same altitude. Altitude hold system 414 may hold the altitude of the aircraft at an altitude selected by an operator. The altitude may be adjusted by changing the pitch angle of the aircraft.

The pitch angle of the aircraft may be controlled using command 418. Pitch angle adjustment system 416 generates adjustment 420 to the pitch angle of the aircraft. Adjustment 420 may change the position of elevator 406 in these examples.

Altitude hold system 414 receives operator input, such as operator command 422. This command is to hold the altitude of the aircraft and may be to hold the altitude of the aircraft at an altitude selected by the operator. This operator command may be generated by a pilot selecting an altitude using a flight control computer and manipulating a control on a yoke, a control column, or some other suitable control device for the aircraft. The operator also may be another computer or device, depending on the particular implementation.

Altitude hold system 414 generates command 418. Command 418 may be adjusted using adjustment 420 as generated by pitch angle adjustment system 416. Command 418 may be the same command as operator command 422, depending on the value for adjustment 420. Command 418 is a command to change the position of elevator 406 in these examples. In the different advantageous embodiments, pitch angle adjustment system 416 generates adjustment 420 to maintain the aircraft at substantially the same altitude, while the aircraft is turning.

In the different advantageous embodiments, pitch angle adjustment system 416 generates adjustment 420 using the lift of the aircraft. In generating adjustment 420, pitch angle adjustment system 416 may use information such as, for example, the roll angle of the aircraft, the roll rate of the aircraft, the weight of the aircraft, and/or dynamic pressure on the aircraft. In these examples, as the aircraft performs a turn, pitch angle adjustment system 416 generates adjustment 420 to maintain the aircraft at substantially the same altitude during turning of the aircraft.

Sensor 408 generates position 428, which provides feedback to servo 404. Servo 404 stops changing the position of elevator 406 when the appropriate position has been reached. In this illustrative example, elevator 406 is adjusted to change the pitch angle of the aircraft. Of course, the different advantageous embodiments may be applied to any control surface that may adjust the pitch of the aircraft in this illustrative example.

The illustration of pitch angle control environment 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, flight control computer 402 may control a number of elevators and/or other control surfaces in addition to elevator 406. In yet other advantageous embodiments, altitude hold system 414 and pitch angle adjustment system 416 may be located on different physical computers, rather than both being executed on flight control computer 402.

Figure 5:
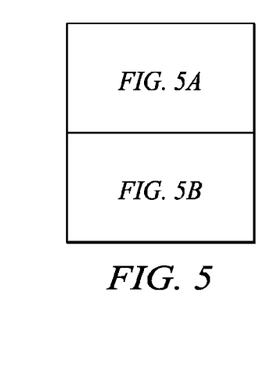
FIGS. 5A and 5B are a diagram of a pitch angle control environment in accordance with an advantageous embodiment.
Figure 5A:
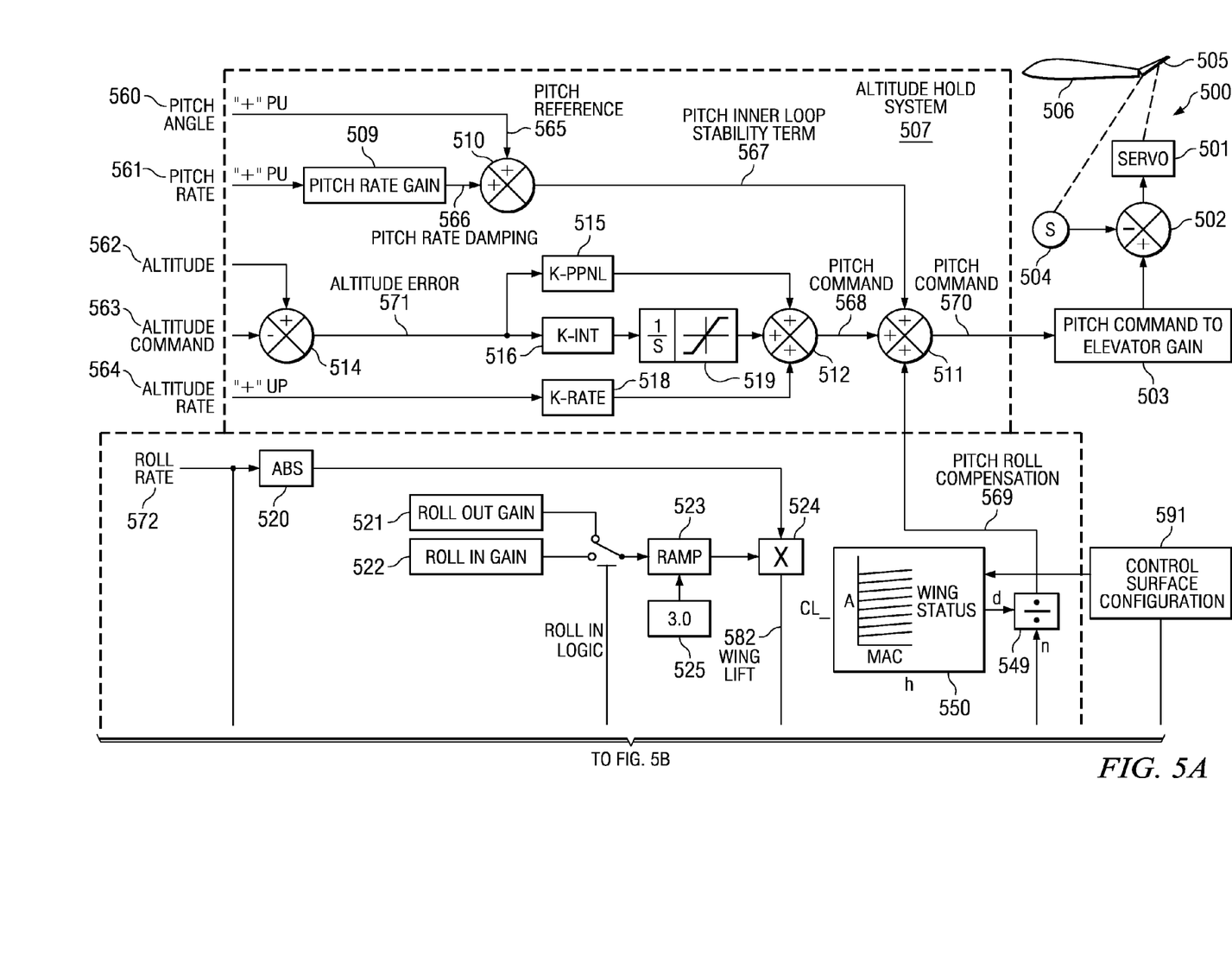
Figure 5B:
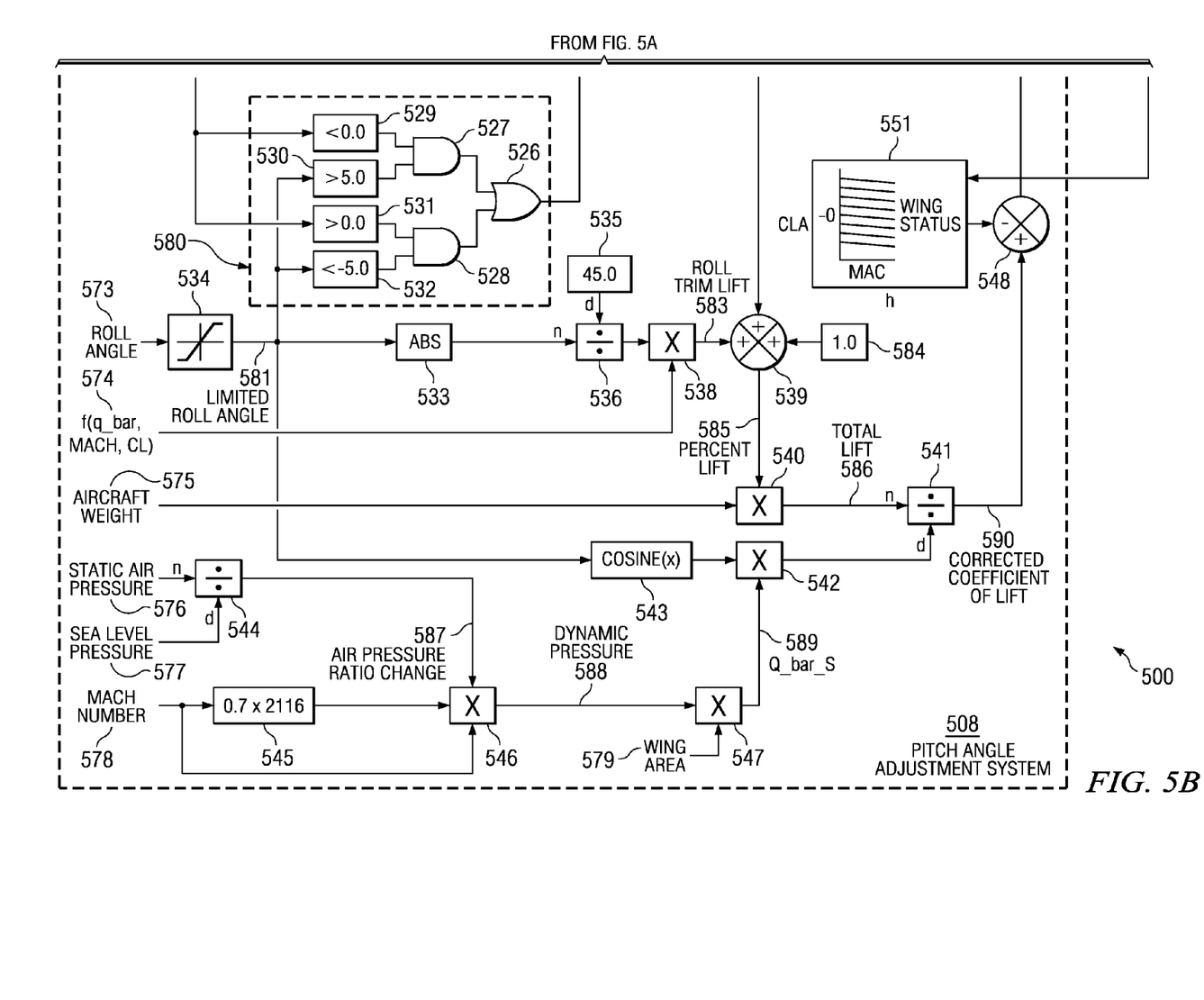

With reference now to FIGS. 5A and 5B, a diagram of a pitch angle control environment is depicted in accordance with an advantageous embodiment. Pitch angle control environment 500 is an example of one implementation for pitch angle control environment 400 in FIG. 4.

Pitch angle control environment 500 may send commands to servo 501 through subtractor 502 and pitch command to elevator gain 503 with feedback from sensor 504 to control the position of elevator 505 on wing 506. Changing of the position of elevator 505 on wing 506 is used to change the pitch angle of the aircraft in these illustrative examples.

Sensor 504 senses the position of elevator 505 and sends this position information back to subtractor 502 as a feedback loop. This feedback loop is used to stop servo 501 from moving elevator 505 when elevator 505 reaches a desired position.

In this example, pitch angle control environment 500 includes altitude hold system 507 and pitch angle adjustment system 508. Altitude hold system 507 is an example of one implementation for altitude hold system 414 in FIG. 4, and pitch angle adjustment system 508 is an example of one implementation for pitch angle adjustment system 416 in FIG. 4.

In this depicted example, altitude hold system 507 includes pitch rate gain 509, adder 510, adder 511, adder 512, subtractor 514, proportional gain 515, integral gain 516, gain unit 518, and pitch combination integrator limiter 519. Pitch combination integrator limiter 519 limits an integral output term to a selected angle. For example, without limitation, the output may be limited to around 10 degrees.

Pitch angle adjustment system 508 includes absolute value unit 520, roll out gain 521, roll in gain 522, ramp 523, multiplier 524, constant 525, OR gate 526, AND gate 527, AND gate 528, logic unit 529, logic unit 530, logic unit 531, logic unit 532, absolute value unit 533, limiter 534, constant 535, divider 536, multiplier 538, adder 539, multiplier 540, divider 541, multiplier 542, cosine unit 543, divider 544, multiplier unit 545, multiplier 546, multiplier 547, subtractor 548, divider 549, table 550, and table 551.

Inputs into altitude hold system 507 include pitch angle 560, pitch rate 561, altitude 562, altitude command 563, and altitude rate 564. Altitude hold system 507 may dampen the oscillatory characteristics of an aircraft. In this example, pitch angle 560, pitch rate 561, and altitude rate 564 are normally positive for "pitch-up" or nose of aircraft 100 in FIG. 1 moving upward relative to a horizontal position. These values may vary from around zero degrees to around six degrees when altitude hold system 507 is used to maintain or hold an altitude for the aircraft.

Pitch angle 560, pitch rate 561, altitude 562, and altitude rate 564 are values that may be obtained from other devices in the aircraft. Altitude command 563 is a command generated by a user, such as a pilot, using a control device in the aircraft.

Pitch angle 560 is also referred to as pitch reference 565. Pitch reference 565 is summed with pitch rate damping 566 to form pitch inner loop stability term 567. Pitch rate damping 566 is obtained by multiplying pitch rate 561 with pitch rate gain 509. Pitch inner loop stability term 567 is added to pitch command 568 and pitch roll compensation 569 to form pitch command 570. Pitch command 570 is sent to pitch command to elevator gain 503 and used to change the position of elevator 505.

Pitch command 568 may be generated using altitude 562, altitude command 563, and altitude rate 564. Altitude command 563 is subtracted from altitude 562 to form altitude error 571. This error is sent to proportional gain 515 and integral gain 516. Altitude rate 564 is sent to gain 518. The output of integral gain 516 is sent to pitch combination integrator limiter 519.

Pitch combination integrator limiter 519 integrates the output of integral gain 516 and limits the maximum output in terms of degrees of pitch. Pitch combination integrator limiter 519 may generate various limits, depending on the particular implementation. For example, the limit may be around minus 2 degrees to around 10 degrees. The outputs of these components are summed by adder 512 to form pitch command 568.

Inputs into pitch angle adjustment system 508 include roll rate 572, roll angle 573, function 574, aircraft weight 575, static air pressure 576, sea level pressure 577, mach number 578, and wing area 579.

In these examples, roll rate 572 is used to estimate the amount of lift loss from the use of wing control surfaces to roll into and out of a turn. This lift loss may be referred to as turning wing lift in these illustrative examples. Wing lift 582 represents the lift on the wing surfaces and is used to create the roll angle to accomplish the turn. In these examples, these wing surfaces may be ailerons, flight spoilers, and/or other surfaces used to turn an aircraft.

Wing lift 582 may provide an estimate or identification of the lift loss from the use of wing surfaces to turn the aircraft. This wing lift amounts to the change in the total lift of the wing. Loss of lift on one side of the wing causes the aircraft to "drop" the wing. This loss starts the turn because the lift vector is no longer vertical, but points in the direction of the turn. In other words, the change in the direction of the lift vector actually creates the turn.

A roll into a turn means that the roll altitude is increased, either to a more positive or negative value. A roll out of a turn means to return to a zero roll angle. Roll rate 572 and roll angle 573 are used, in these examples, to determine whether the aircraft is rolling into a turn or rolling out of a turn to select a higher gain or a lower gain, depending on the amount of lift loss. In these depicted examples, the higher gain is represented by roll in gain 522, and the lower gain is represented by roll out gain 521.

The selection of one of these gains is made using roll in logic 580. Roll in logic 580 is formed by logic unit 529, logic unit 530, AND gate 527 or by logic unit 531, logic unit 532, AND gate 528, OR gate 526 selects roll in gain 522 when OR gate 526 outputs a logic 1. Roll rate 572 is an input into logic unit 529 and logic unit 530. Logic unit 529 generates a logic 1 if roll rate 572 is less than around 0.0. Logic unit 530 generates a logic 1 if roll rate 572 is greater than around 0.0.

Logic unit 530 and logic unit 532 receive a limited value of roll angle 573 to determine roll polarity. The output of logic unit 530 is a logic 1 for a positive (right) roll of five degrees or more. In these examples, a position roll is a right roll. The output of logic unit 532 is a logic 1 for a negative roll of around negative five degrees or less (more negative). A negative roll is a left roll. Only one of these two logic gates may output a logic 1 at any given time.

Limiter 534 limits roll angle 573 to a value between around minus 70 degrees to around plus 70 degrees. Of course, the value may vary, depending on the particular implementation. Limiter 534 is used to avoid dividing by zero when roll angle 573 is sent into cosine unit 543 with the output being sent to multiplier 542 and that output being used as the denominator for divider 541. Limiter 534 generates limited roll angle 581.

Logic unit 530 generates a logic 1 if limited roll angle 581 is greater than around five degrees. Logic unit 532 generates a logic 1 when limited roll angle 581 is less than around minus five degrees. Roll in logic 580 is a logic 1 if limited roll angle 581 is more than around five degrees and roll rate 572 is less than around zero degrees per second. Roll in logic 580 also is a logic 1 when limited roll angle 581 is less than around minus five degrees and roll rate 572 is more than around zero degrees per second. The logic 1 or logic zero for roll in logic 580 may be used to determine whether a wing, such as a right wing, is currently at a positive roll angle and returning to zero roll angle.

When roll in logic 580 is a logic 1, wing lift 582 may be a product of an absolute value of roll rate 572 multiplied by roll in gain 522 as processed through ramp 523. Ramp 523 smoothes the change from one value to another value input that is into ramp 523 using constant 525.

In this depicted example, constant 525 is around 3.0. In this example, constant 525 represents the amount of seconds that ramp 523 uses to change the value from one input value to another input value. Constant 525 represents a ramp of around 3.0 seconds and may be used to smooth a crossover from the roll in gain to the roll out gain as roll angle passes through zero. This situation may occur when changing direction of roll from right to left or left to right.

When roll in logic 580 is a logic zero, wing lift 582 is the absolute value of roll rate 572 multiplied by roll out gain 521. In these examples, roll in gain 522 is larger than roll out gain 521. This selection of values may count for additional control force needed for a roll out as compared to a roll in for a turn.

Roll trim lift 583 is generated using roll angle 573 and function 574. In these illustrative examples, roll trim lift 583 may be used to identify vertical lift loss. The vertical lift loss is caused by the roll angle, which places the lift vector at an angle to earth verticality. The lift change that is caused by the trim change, that is required for an apparent weight increase for the normal load factor at the turn roll angle and thrust change, to compensate for increased drag at the roll angle.

In these illustrative examples, roll trim lift 583 is identified from three sources. These sources include, for example, vertical lift loss caused by the roll angle, lift lost or gained due to the trim change, and lift lost or gained from thrust affects. The process used in pitch angle adjustment system 508 to determine "lift loss" does not distinguish between the sources but uses these sources in their entirety.

Function 574 is a function of dynamic pressure, a coefficient of lift, and a mach number in these examples. Function 574 is as follows in this illustrative example:

$$F(Q\_Bar, Mach, CL) = K0 + Kq1 \times Q\_Bar + Kq2 \times Qc^2 + Kq3 \times Qc^3 + Kc1 \times CL + Kc2 \times CL^2 + Kc3 \times CL^3 + Km1 \times Mach + Km2 \times Mach^2 + Km3 \times Mach^3.$$

F(Q_Bar, Mach, CL) is function 574 where K0 is a constant; Kq1, Kq2, and Kq3 are polynomial coefficients for Q_Bar; Kc1, Kc2, and Kc3 are polynomial coefficients for CL; Km1, Km2, and Km3 are polynomial coefficients for Mach; Qc is dynamic pressure; Q_Bar is dynamic pressure and may be calculated as 0.7×2116×Delta×Mach×Mach if computed dynamic pressure or Qc is measured; Delta is atmospheric air pressure ratio; Mach is the Mach number; CL is coefficient of lift and may be calculated as Weight/(Q_Bar_S); Q_Bar_S is equal to Q_Bar×S; S is the aerodynamic wing area in square feet; and Weight is obtained from existing computation on the aircraft, pilot entry, flight management computers, or calculation from aircraft sensors.

The absolute value of limited roll angle 581 is divided by constant 535. In these examples, constant 535 is around 45.0. Constant 535 is used, in these examples, to assign a percentage of the affect from function 574 to the roll angle such that around 100 percent is used at around 45 degrees of turns. In these illustrative examples, the assignment is a linear assignment. In other advantageous embodiments, sine function of roll may be used with the sine of 45 degrees, which is 0.707, replacing the division by 45 to provide around 100 percent at 0.707.

The output of divider 536 is multiplied by function 574 to form roll trim lift 583. Roll trim lift 583 is summed with wing lift 582 and a value of one provided by constant 584. The output of adder 539 is percent lift 585. Percent lift 585 is multiplied by aircraft weight 575 at multiplier 540 to form total lift 586.

Total lift 586 may be divided by divider 541 using a value generated from static air pressure 576, sea level pressure 577, and mach number 578. Static air pressure 576 is divided by sea level pressure 577 at divider 544 to form air pressure ratio change 587. Mach number 578 is multiplied by constant 545. In this example, constant 545 is around 0.7×2116. Constant 545 represents a conversion factor for converting a mach×air pressure ratio to pounds per square foot.

The output from constant 545 is sent to multiplier 546 along with mach number 578. These values are multiplied by air pressure ratio change 587 by multiplier 546 to generate dynamic pressure 588.

Dynamic pressure 588 is multiplied by wing area 579 at multiplier 547 to generate Q_bar_S 589. Q_bar_S 589 represents dynamic pressure×wing area in which S is the wing area. Cosine function 543 generates a cosine of limited roll angle 581. In these illustrative examples, cosine of limited roll angle 581 may be used to identify the corrected coefficient of lift as follows:

$$CL = \text{Lift}/(\text{cosine roll} \times Q\_bar\_S),$$

where CL is corrected coefficient of lift 590, lift is total lift 586, and Q_bar_S is Q_bar_S 589.

The total lift, at this point, is the weight of the aircraft and affects of turning lift. Dividing by cosine of roll computes the component of lift that is vertical in the earth's axis system and the required lift to maintain level flight with substantially no altitude changes. In these examples, the equation is implemented in pitch angle adjustment system 508. For example, limited roll angle 581 is multiplied by Q_bar_S 589 at multiplier 542. The output of multiplier 542 forms a denominator. This denominator is used to divide total lift 586 at divider 541 to form corrected coefficient of lift 590.

Corrected coefficient of lift 590 is adjusted using table 550 and table 551. In the illustrative examples, table 550 and table 551 correct a coefficient of lift based on pitch roll compensation. In other words, these tables provide a number of conversion values. These conversion values convert corrected coefficient of lift 590 to a pitch angle. The number of conversion values may provide this conversion through a ratio of a pitch angle to a lift coefficient in these illustrative examples.

These conversion values are generated based on control surface configuration 591, which is used as an input into table 550 and table 551. Control surface configuration 591 may be identified from various sensors that may be used to identify the locations of various control surfaces.

The control surfaces may include, for example, without limitation, flaps, slats, spoilers, landing gear, landing gear doors, body speed brakes, deployable landing lights, and other suitable control surfaces or other moveable surfaces that may affect the wing and/or fuselage configuration in a manner that affects the coefficient of lift for the aircraft. Of course, any moveable surface or feature on the fuselage and/or wing may be taken into account. Further, engine thrust also may be taken into account. Further, tables 550 and 551 may be implemented in a number of different ways.

Each of table 550 and table 551 may be a plurality of graphs and tables in which each graph or table within the tables may be used to identify an adjustment value for use with corrected coefficient of lift 590. The number of conversion values from tables 550 and 551 are applied to corrected coefficient of lift 590 to form pitch roll compensation 569.

In these examples, table 550 generates a value representing the slope of the relationship between the coefficient of lift for the aircraft and the angle of attack for the aircraft. The value from table 551 represents the intercept of the line with a y-axis. The slope and intersection are a function of control surface configuration 591.

In these examples, table 550 and table 551 generate values for the following equations:

$$Cl = CL\_A\_0 + CL\_A \times \text{Alpha}$$

$$\text{Alpha} = (CL\_A - CL\_A\_0)/CL\_A,$$

where CL is corrected coefficient of lift 590, CL_A is the output of table 551, CLA_0 is the output of table 550, and Alpha at level flight is pitch. The pitch is used in the pitch command in these examples.

A value generated from table 551 is subtracted from corrected coefficient of lift 590 at subtractor 548. The corrected coefficient of lift is divided by a value generated by table 550 to form pitch roll compensation 569.

Pitch roll compensation 569 is the amount of compensation to the pitch angle needed to maintain a substantially level flight for the aircraft. In other words, pitch roll compensation 569 provides a value to correct a pitch angle to substantially hold an altitude when the aircraft is performing turns. These turns may include steep roll angles or roll attitudes.

The logic in pitch angle control environment 500 is an example of one manner in which different advantageous embodiments may be implemented. Further, logic in pitch angle control environment 500 may be implemented as hardware and/or software. In these illustrative examples in FIGS. 5A and 5B, the logic in pitch angle control environment 500 is implemented in program code in a functional form that is executed by flight control computer 402 as a number of processes in control laws 412. These processes may be, for example, altitude hold system 414 and pitch angle adjustment system 416 in FIG. 4.

Figure 6:
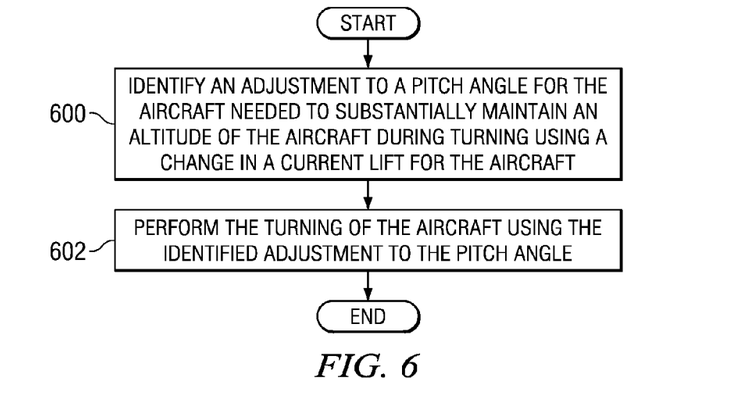
FIG. 6 is a flowchart of a process for operating an aircraft in accordance with an advantageous embodiment.

With reference to FIG. 6, a flowchart of a process for operating an aircraft is depicted in accordance with an advantageous embodiment. The process illustrated in FIG. 6 may be implemented using an aircraft, such as aircraft 100 in FIG. 1. In particular, the process may be implemented in control laws on a computer in the aircraft. These control laws may be, for example, control laws 412 executing on flight control computer 402 in FIG. 4.

The process begins by identifying an adjustment to a pitch angle for the aircraft needed to substantially maintain an altitude of the aircraft during turning using a change in a current lift for the aircraft (operation 600). In the illustrative examples, the current lift is a calculated value. Current lift may be calculated in pitch angle adjustment system 508. For example, the current lift may be total lift 586. This operation may be performed during the turning of the aircraft. This operation may be performed dynamically while the aircraft is performing the turn.

The process then performs the turning of the aircraft using the identified adjustment to the pitch angle (operation 602), with the process terminating thereafter. This process may be repeated any number of times during the turning of the aircraft. In some of the advantageous embodiments, this process may be performed continuously or in response to events that may occur during the turning of the aircraft.

Figure 7:
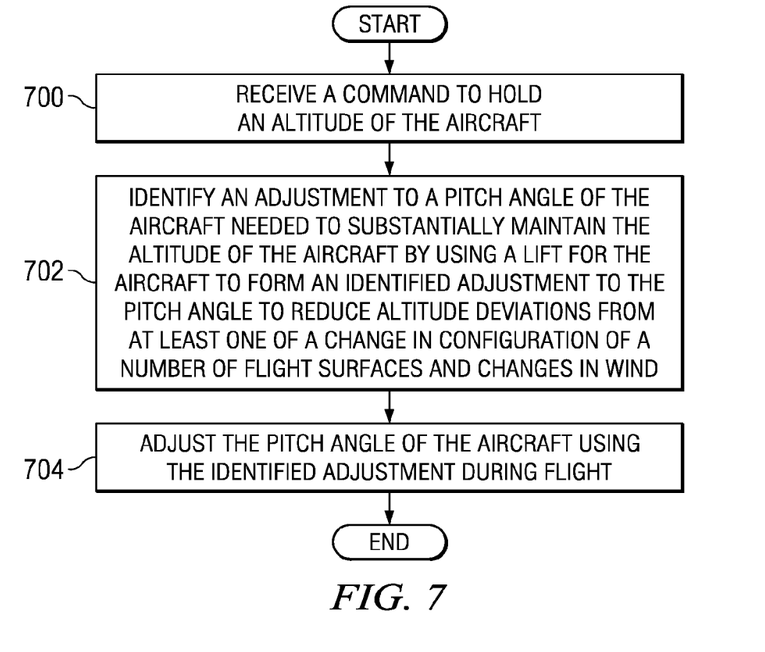
FIG. 7 is a flowchart of a process for operating an aircraft in accordance with an advantageous embodiment.

Turning to FIG. 7, a flowchart of a process for operating an aircraft is depicted in accordance with an advantageous embodiment. The process illustrated in FIG. 7 may be implemented using an aircraft, such as aircraft 100 in FIG. 1. In particular, the process may be implemented in control laws on a computer in the aircraft. These control laws may be, for example, control laws 412 executing on flight control computer 402 in FIG. 4.

The process begins by receiving a command to hold an altitude of the aircraft (operation 700). An adjustment to a pitch angle of the aircraft needed to substantially maintain the altitude of the aircraft is identified using a lift for the aircraft to form an identified adjustment to the pitch angle to reduce altitude deviations from at least one of a change in configuration of a number of flight surfaces and changes in wind (operation 702). The pitch angle of the aircraft is adjusted using the identified adjustment during flight (operation 704), with the process terminating thereafter.

The process in FIG. 7 may be used even when the aircraft is not turning. The process in FIG. 7 may provide adjustments to the pitch angle to maintain the aircraft at substantially the same altitude in response to other conditions other than the occurrence of a turn.

For example, the process may be used to maintain the aircraft in substantially the same altitude in response to change in the flight control surface configurations, such as extending flaps, retracting flaps, and/or some other change in the flight control surface configuration. This process also may be used to maintain the aircraft at substantially the same altitude in response to wind.

The flowcharts and block diagrams in the different depicted embodiments illustrate the architecture, functionality, and operation of some possible implementations of apparatus, methods, and computer program products. In this regard, each block in the flowcharts or block diagrams may represent a module, segment, or portion of computer usable or readable program code, which comprises one or more executable instructions for implementing the specified function or functions.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for operating an aircraft. In the different advantageous embodiments, the lift of the aircraft may be used to identify a coefficient of lift. The coefficient of lift may approximate a loss of lift due to the control surfaces changing configuration for the turn. In these examples, this change in lift may be used to identify an adjustment to the pitch angle needed to maintain substantially the same altitude throughout the turn.

With one or more of the different advantageous embodiments, an aircraft may hold an altitude at substantially the same level more accurately. The different advantageous embodiments may provide this feature by accounting for weight, wing area, and lift loss due to changes in the control surface that occur during the turn. Further, with the different advantageous embodiments, deviations that may be caused by wind and turbulence also may be reduced.

Further, with the different advantageous embodiments, a reduction in altitude deviation may be realized as flaps are lowered and retracted. This feature may occur through modifying the pitch attitude of flaps as they are retracted and/or extended to maintain a constant altitude. Further, one or more of the different advantageous embodiments provides a capability to adjust for roll angles above 30 degrees as compared to the currently used mechanisms.

When flaps are moved from one position to another, this change in configuration has a large affect on lift and there is a large altitude transient created. The large altitude transient may be a variation in altitude from around 10 feet to around 25 feet in these illustrative examples. This change in altitude occurs because the autopilot responds by sensing the deviation from the altitude command and then responds to deviation, but it is too late to prevent the deviation in altitude without one or more of the different advantageous embodiments.

The pitch turn angle adjustment system, in the advantageous embodiments, includes a flap input, and it automatically corrects pitch attitude as the flaps are moved and the altitude transient is reduced to substantially maintain the altitude of the aircraft. For example, the altitude may be maintained substantially with a reduced altitude deviation of around three feet to around five feet as compared to around 10 feet or around 25 feet with currently used mechanisms. This reduced deviation may maintain the aircraft at substantially the same altitude in these depicted examples.

The different advantageous embodiments automatically provide this type of adjustment in response to changes in flight surface configurations. This may be taken into account between corrected coefficient of lift 590 and pitch roll compensation 569 in FIGS. 5A and 5B.

The different advantageous embodiments also may compensate for wind changes in a manner that substantially maintains the altitude of the aircraft. If the wind increases airspeed, mach number 578 increases and Q_Bar_S 589 also increases. Q_Bar_S 589 is a divisor for total lift 586, which is unchanged since total lift 586 is based on weight, which is not changing. Corrected coefficient of lift 590 decreases, which ends up with a decreased value for pitch roll compensation 569 in FIGS. 5A and 5B.

With a wind increase, Q_bar_S 589 increases, resulting in a decreased value for pitch roll compensation 569, which will decrease pitch attitude to keep lift constant. This action decreases pitch activity in gusty wind conditions and actually makes the riding qualities of the aircraft smoother. These two features may occur using pitch angle adjustment system 508 in FIGS. 5A and 5B.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer-usable or computer-readable medium providing program code for use by, or in connection with, a computer or any device or system that executes instructions. For the purposes of this disclosure, a computer-usable or computer-readable medium can generally be any tangible apparatus that can contain, store, communicate, propagate, or transport the program for use by, or in connection with, the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. For example, the different depicted examples illustrate the process being executed on a computer in the aircraft.

In some advantageous embodiments, the processes may be located remotely. For example, without limitation, the processes may be executed on another computer in another aircraft, or may be executed on the ground and may provide pitch angle adjustments to the aircraft. With this type of embodiment, the aircraft sends the data needed to identify the adjustment to the remote location.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for operating an aircraft, the method comprising:
   determining an output from a roll in logic based upon an OR gate processing outputs from dual AND gates processing logic unit outputs based upon inputs comprising: a roll rate, and a limited roll angle, for the aircraft;
   selecting, using the output from the roll in logic, at least one of: a roll in gain and a roll out gain;
   deriving a current lift for the aircraft, using a pitch angle adjustment system comprising at least one of: the roll in gain, and the roll out gain;
   responsive to a turning of the aircraft when holding an altitude, identifying, using the current lift for the aircraft, an identified adjustment to a pitch angle of the aircraft needed to substantially maintain the altitude of the aircraft during the turning of the aircraft; and
   performing the turning of the aircraft using the identified adjustment.

2. The method of claim 1, wherein the step of identifying the identified adjustment comprises:
   identifying a corrected coefficient of lift for the aircraft from the current lift for the aircraft;
   identifying a number of conversion values from a control surface configuration of the aircraft to form a number of identified conversion values; and
   applying the number of identified conversion values to the corrected coefficient of lift to identify the adjustment to the pitch angle of the aircraft needed to substantially maintain the altitude of the aircraft during the turning of the aircraft, using a coefficient of lift and a number of values for the aircraft to form the identified adjustment to the pitch angle from the coefficient of lift for the aircraft.

3. The method of claim 2, wherein the step of identifying the corrected coefficient of lift for the aircraft from the current lift for the aircraft comprises:
   identifying the corrected coefficient of lift using the roll rate, a roll angle of the aircraft, a weight of the aircraft, and a dynamic pressure on the aircraft during the turning of the aircraft.

4. The method of claim 3, wherein the roll rate is used to identify a roll trim lift and the roll angle is used to identify a wing lift during the turning of the aircraft.

5. The method of claim 2, wherein the number of conversion values comprises a slope and a y-intercept.

6. The method of claim 2, wherein the number of conversion values is a number of values representing a ratio of the pitch angle to the coefficient of lift.

7. The method of claim 2, wherein the current lift comprises: a lift loss component, from using control surfaces for the turning of the aircraft, and current lift component inputs to the pitch angle adjustment system, the components based upon a lift equation, $L=0.7*2116*Delta*Mach*Mach*C_L*S$, comprising: an aircraft weight, a static air pressure, a sea level pressure, a mach number, and a wing area; wherein "S" comprises the wing area, "Mach" comprises the mach number, "Delta" comprises an atmospheric pressure ratio derived from the static air pressure and the sea level pressure, and "$C_L$" comprises the coefficient of lift calculated from the aircraft weight.

8. The method of claim 6, further comprising, the roll in logic determining whether the aircraft is rolling into a turn or rolling out of the turn and then selecting a corresponding gain adjustment depending on an amount of change to the current lift, wherein a lift loss component from using control surfaces for the turning of the aircraft comprises the roll rate and a roll trim lift.

9. The method of claim 2, wherein the corrected coefficient of lift is as follows:
   corrected coefficient of lift=(weight of aircraft+roll trim lift+turning wing lift)/(cosine(roll angle)*dynamic pressure*wing area).

10. The method of claim 1, wherein the identifying step is performed dynamically during the turning of the aircraft.

11. The method of claim 1, wherein the identifying step is performed continuously during the turning of the aircraft.

12. The method of claim 1 further comprising:
   responsive to holding the altitude of the aircraft, identifying the adjustment to the pitch angle of the aircraft needed to substantially maintain the altitude of the aircraft, using the current lift for the aircraft to form the identified adjustment to the pitch angle to reduce altitude deviations from at least one of a change in configuration of a number of flight surfaces and changes in wind; and
   adjusting the pitch angle of the aircraft using the identified adjustment during flight.

13. A method for operating an aircraft, the method comprising:

responsive to a command to hold an altitude of the aircraft, reducing an altitude deviation of the aircraft by identifying an adjustment to a pitch angle of the aircraft, -using a pitch roll compensation for the aircraft;

deriving, using a pitch angle adjustment system, a corrected coefficient of lift from inputs comprising a roll rate and a limited roll angle processed through a roll in logic selecting at least one of: a roll in gain, and a roll out gain, such that the roll in logic comprises an OR gate processing outputs from dual AND gates;

deriving the pitch roll compensation, from inputs comprising: the corrected coefficient of lift, and at least one of: a configuration of a flap, a slat, a spoiler, a landing gear, and a landing gear door, of the aircraft; and adjusting the pitch angle of the aircraft using the adjustment during flight.

14. An apparatus comprising:

processor unit configured to:

identify, in response to a command to hold an altitude of an aircraft, an identified adjustment to a pitch angle of the aircraft;

generate a limited roll angle;

select at least one of: a roll in gain, and a roll out gain, based upon a roll rate and the limited roll angle processed through a roll in logic comprising an OR gate configured to process outputs from dual AND gates configured to process outputs from logic units configured to receive the roll rate and limited roll angle;

derive a corrected coefficient of lift from inputs comprising: the roll rate, and the limited roll angle;

form the identified adjustment based upon the corrected coefficient of lift for the aircraft;

reduce altitude deviations caused by at least one of: a change in configuration of at least one of: a flap, a slat, a spoiler, a landing gear, and a landing gear door, of the aircraft; and change in a wind; and adjust, using the identified adjustment during flight, the pitch angle of the aircraft; and a computer configured to store and execute instructions for software on the processor unit.

15. An apparatus comprising:

a processor unit configured to identify an adjustment, to a pitch angle during a turning of an aircraft, needed to substantially maintain an altitude of the aircraft, using a change in a current lift for the aircraft, such that the current lift is derived, in a pitch angle adjustment system, from inputs comprising: a roll rate, and a limited roll angle, to from an identified adjustment, such that the identified adjustment is identified, by the processor unit during the turning of the aircraft, from inputs comprising a pitch roll compensation, and such that the processor comprises a roll in logic configured to generate an output configured to select at least one of: a roll in gain, and a roll out gain based upon the roll rate and the limited roll angle, such that the roll in logic comprises logic units connected to AND gates connected to an OR gate; and a processor unit configured to perform the turning of the aircraft using the adjustment to the pitch angle of the aircraft.

16. The apparatus of claim 15, wherein in identifying the adjustment, to the pitch angle of the aircraft needed to substantially maintain the altitude of the aircraft during the turning of the aircraft, using the current lift for the aircraft to form the identified adjustment to the pitch angle, the process is configured to identify a corrected coefficient of lift for the aircraft from the current lift for the aircraft; identifying a number of conversion values from a control surface configuration of the aircraft to form a number of identified conversion values; and applying the number of identified conversion values to a coefficient of lift to identify the adjustment to the pitch angle of the aircraft needed to substantially maintain the altitude of the aircraft during the turning of the aircraft, using the coefficient of lift and a number of values for the aircraft to form the identified adjustment to the pitch angle from the coefficient of lift for the aircraft.

17. The apparatus of claim 16, wherein in identifying the corrected coefficient of lift for the aircraft from the current lift for the aircraft, the process is capable of identifying the corrected coefficient of lift using the roll rate, a roll angle of the aircraft, a weight of the aircraft, and a dynamic pressure on the aircraft during the turning of the aircraft.

18. The apparatus of claim 17, wherein the roll rate is used to identify a roll trim lift and the roll angle is used to identify a turning wing lift.

19. The apparatus of claim 16, wherein the number of conversion values is a number of values representing a ratio of the pitch angle to the coefficient of lift.

20. The apparatus of claim 16, wherein the current lift comprises: a lift loss component from using control surfaces for the turning of the aircraft and current lift component inputs to the pitch angle adjustment system, the components based a lift equation, $L=0.7*2116*Delta*Mach*Mach*C_L*S$, comprising: an aircraft weight, a static air pressure, a sea level pressure, a mach number, and a wing area; wherein "S" comprises the wing area, "Mach" comprises the mach number, "Delta" comprises an atmospheric pressure ratio derived from the static air pressure and the sea level pressure, and "$C_L$" comprises the coefficient of lift calculated from the aircraft weight.

21. The apparatus of claim 20, wherein the lift loss component from using control surfaces for the turning of the aircraft comprises the roll rate and a roll trim lift.

22. The apparatus of claim 16, wherein the corrected coefficient of lift is as follows:

corrected coefficient of lift=(weight of aircraft+roll trim lift+turning wing lift)/(cosine(roll angle)*dynamic pressure*wing area).

23. A computer program product for operating an aircraft, the computer program product comprising:

a non-transitory computer recordable storage medium;

a program code, stored on the non-transitory computer recordable storage medium, configured to identify an adjustment, to a pitch angle of the aircraft needed to substantially maintain an altitude of the aircraft during a turning of the aircraft, using a current lift for the aircraft, such that the current lift is derived by the computer program product from inputs comprising: a roll rate, and a limited roll angle, to form, from inputs comprising a pitch roll compensation, the adjustment to the pitch angle, in response to the turning of the aircraft when holding the altitude such that the program code comprises a roll in logic configured to generate an output configured to select at least one of: a roll in gain, and a roll out gain based upon the roll rate and the limited roll angle, such that the roll in logic comprises logic units connected to AND gates connected to an OR gate; and program code, stored on the computer recordable storage medium, for performing the turning of the aircraft using the adjustment to the pitch angle of the aircraft.

* * * * *